Aug. 16, 1949.   A. AEPPLI   2,479,287
GEAR PLANING MACHINE
Filed March 7, 1945   4 Sheets-Sheet 3

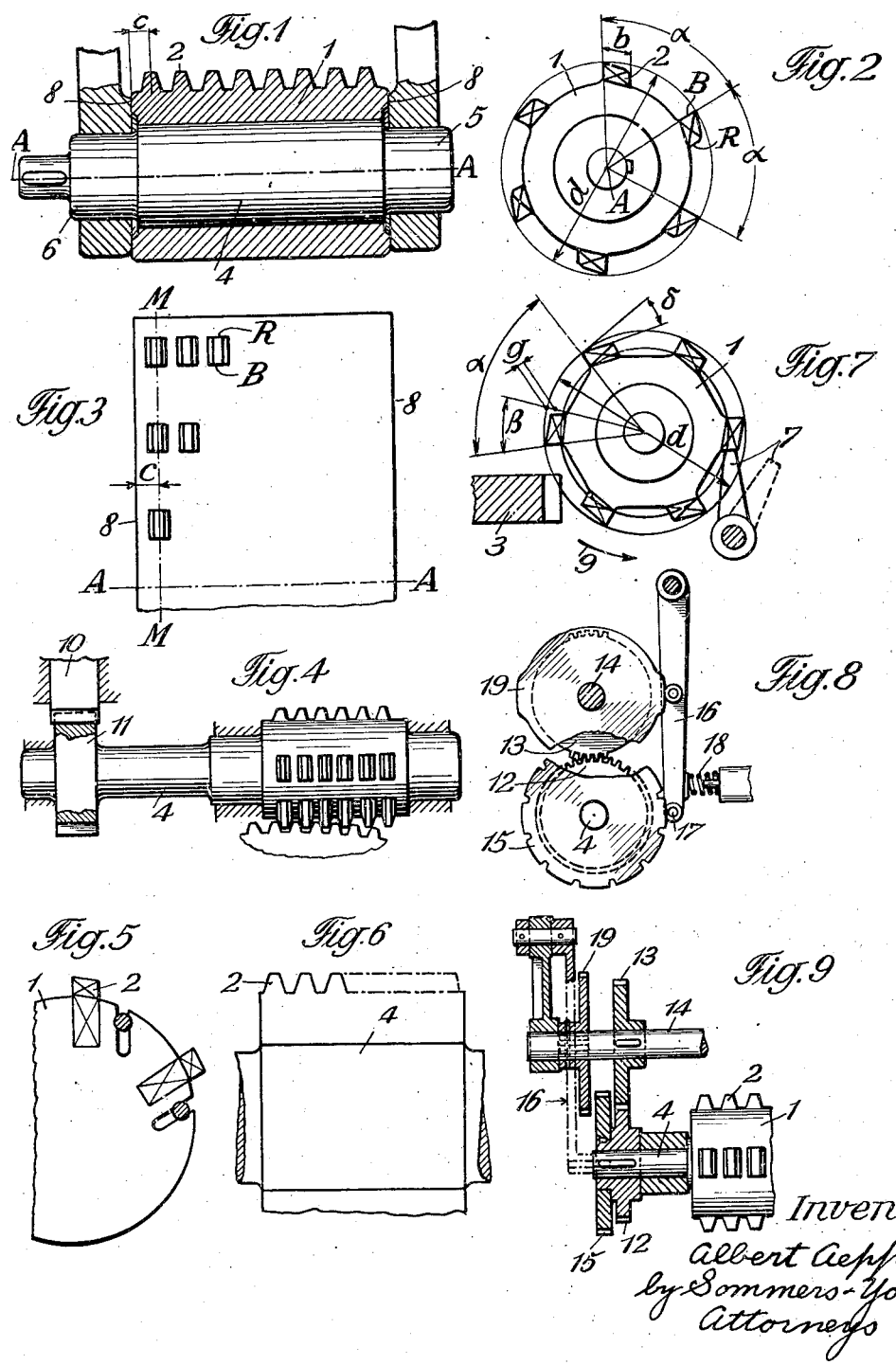

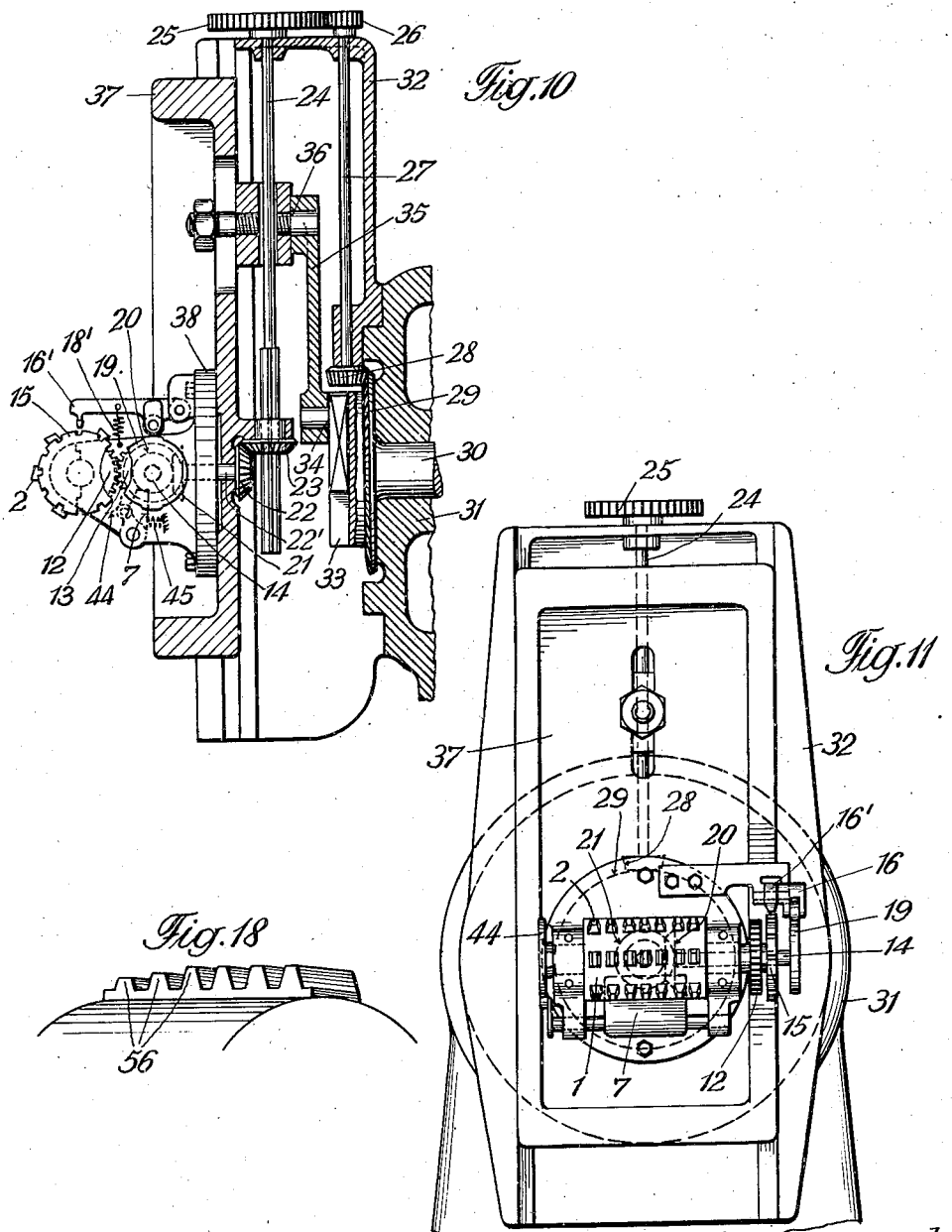

Inventor:
Albert Aeppli
by Sommer & Young
Attorneys

Aug. 16, 1949.  A. AEPPLI  2,479,287
GEAR PLANING MACHINE
Filed March 7, 1945  4 Sheets-Sheet 4
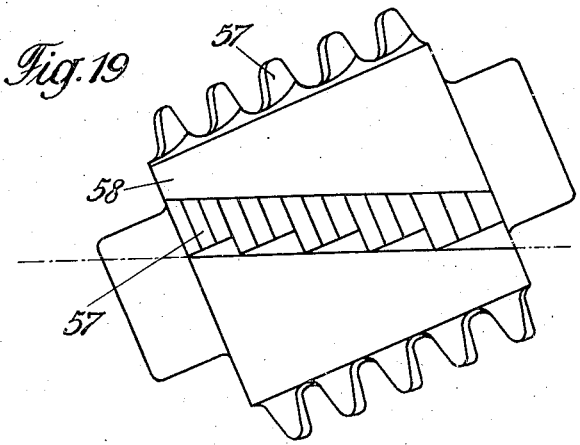
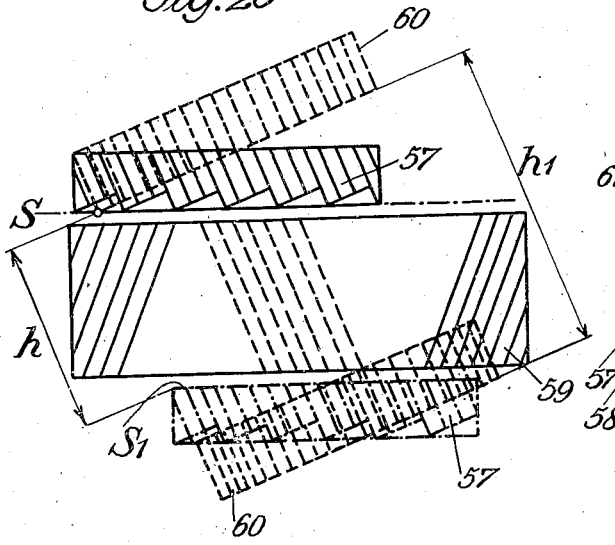
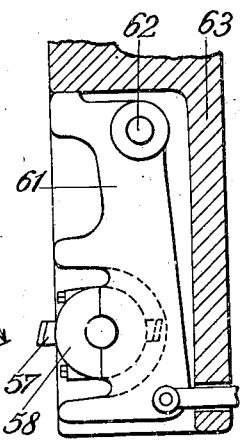
Inventor:
Albert Aeppli
by Sommers·Young
Attorneys Patented Aug. 16, 1949

2,479,287

UNITED STATES PATENT OFFICE 2,479,287

GEAR PLANING MACHINE

Albert Aeppli, Zurich, Switzerland, assignor to Maag-Zahnräder und -Maschinen Aktiengesellschaft, Zurich, Switzerland Application March 7, 1945, Serial No. 581,358
In Switzerland December 2, 1943

Section 1, Public Law 690, August 8, 1946
Patent expires December 2, 1963

9 Claims. (Cl. 90—8)

This invention relates to gear planing machines.

All gear planing machines operating by means of a comb like chasing tool have the drawback that the time of accuracy, that is, of unaltered cutting efficiency of the tool is small compared with that of a rotatable chaser or an involute generating milling cutter for the reason that the comb like chasing tool has a much smaller number of teeth than said two other tools. In consequence thereof, if small gear planing machines are concerned, the comb like chasers must be exchanged for re-sharpened chasers after the cutting of a certain number of gears. This exchanging of tools, however, brings with it not only a certain waste of time but has besides the inconvenience that in series production of gears, particularly if unskilled machine attendants are employed, a skilled laborer must be called upon each time for effecting the exchanging of the tool and the re-adjustment of the machine.

In cutting tooth systems in larger gears, that is, if large gear planing machines are involved, the reduced time of tool integrity has the drawback that the cutting efficiency of the tool is smaller at the end of the working of a gear than at the beginning of operating so that inaccuracies of the tooth system ensue. If an involute cutting gear planing machine operates in such manner that each time after a sequence of tool strokes a tooth on the work piece is finished on the completion of another tooth, the teeth having been cut at the beginning of the working with a sharp tool will come to lie adjacent to those teeth that have been cut with the somewhat dulled tool. In that case the alteration of cutting efficiency makes itself felt as an error of division in the course of the working, at the point of transition from the first to the last tooth.

With other gear planing machines that operate on the principle of relative rolling motion between parts, in which after each tool stroke the work performs a rotational movement and one tooth gap is superficially cut after the other and is then further worked until after the final rotational movement of the work all the teeth are completed the alteration of cutting efficiency of the tool results in inaccuracy of profiling.

The present invention has for its object to eliminate these drawbacks. This is accomplished by arranging on the tool carrier ram a tool carrier drum which is rotatable and fixable in position of rotation and which is capable of receiving several comb like chasing tools in parallel relation to each other so that the centre lines of their teeth move in planes extending perpendicularly to the axis of the drum as the drum rotates.

These comb like chasing tools can be arranged for operating on the work in succession. The tool carrier drum can be arranged on the tool carrier ram for rotation about its own axis and so as to be prevented from rotating by means of an arresting member. For this purpose the tool carrier drum and a normal comb like chasing tool may be mounted in a plate which is pivotally supported by the tool carrier ram so that the required release of the tool for clearing the work during the ram return stroke is effected by a rearward movement of the pivotal plate or, for avoiding such rearward movement, the tool carrier drum is rotated to such an extent prior to the return stroke of the tool carrier ram taking place that the teeth of the tool are prevented from contacting with the work.

In gear planing machines which serve for the machining of gears such as used in the manufacture of automobiles and machine tools and the number of gear teeth of which and consequently also the time of planing thereof is relatively small, with one and the same comb like chasing tool several gears can be planed before the cutting capacity of the tool diminishes in noticeable manner. Therefore, with such machines the tool carrier drum can be rotatively advanced by hand, after a certain number of gears have been cut, through an angular range with the result of adjusting the next comb like chasing tool into operative position and to arrest the tool carrier drum.

As regards the machining of tooth systems of larger gears, wherein the time required for the planing of a gear may last not only for hours but for days, the tool carrier drum must be advanced at certain predetermined times apart in order to provide for the alteration of cutting capacity occurring in the course of the machining to be distributed uniformly among all the teeth. In such a case the tool carrier drum can no more be arbitrarily turned by hand, as desired, due to the necessity for effecting this turning regularly, for example, either on the completion of the machining of each individual tooth, or preferably, each time after the completion of a working stroke.

Several embodiments of the invention are illustrated, by way of example only, in the accompanying drawings in which Fig. 1 shows a longitudinal section of an exemplification of a tool according to the present invention;

Fig. 2 shows a side elevation thereof;

Fig. 3 represents a development of a part of the tool carrier drum shown in Figs. 1 and 2;

Fig. 4 shows an exemplification of a tool and of a contrivance for holding same, according to the present invention;

Figs. 5 and 6 show a species of a tool carrier drum, according to the present invention, with comb like planing tools held thereby;

Fig. 7 is a view of a tool carrier drum according to the present invention, inclusive of arresting means for the drum in operative position;

Fig. 8 shows an exemplification of feed means for intermittently rotating the tool carrier drum in elevation;

Fig. 9 shows a vertical section of Fig. 8;

Fig. 10 shows an elevation partly in section of an exemplification of a ram actuating device of the machine according to the present invention with the arrangement of the tool carrier drum and of a feed device;

Fig. 11 shows a side elevation of the tool carrier ram, inclusive of the tool carrier drum and the associated feed means;

Figure 14:
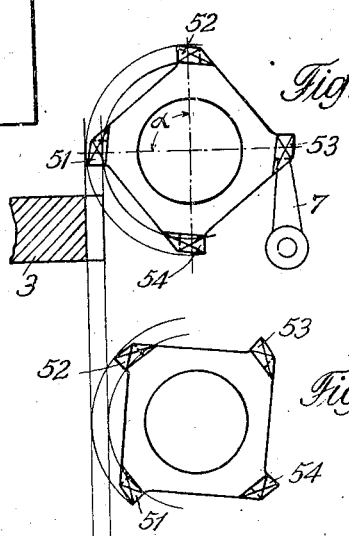
Figure 15:
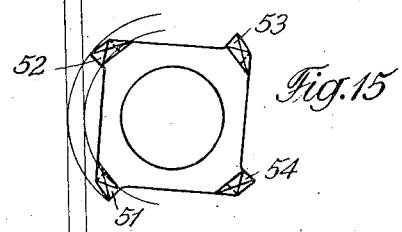
Figure 16:
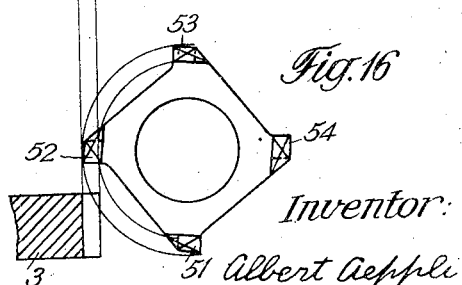
Figure 17:
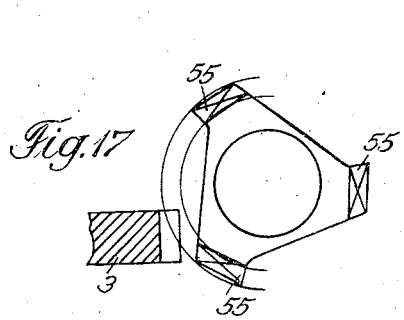

Figs. 14, 15 and 16 each illustrate schematically one of three different phases of positioning of a tool relative to the work in the course of a reciprocation of the tool;

Fig. 17 is a view of a tool carrier drum provided with three comb like planing chasing tools in released position due to pivotal displacement;

Figs. 18 and 19 each depict a different species of a comb like planing tool;

Fig. 20 is a schematic view illustrating a comb like chasing tool corresponding to that shown in Fig. 19 and the mode of application of said tool, and Fig. 21 is a schematic view of the arrangement of the tool carrier drum on a pivotal tool carrier plate.

In Figs. 1 and 2 of the drawings a tool carrier drum 1 is shown to carry a number of equal comb like chasing tools 2 having teeth with rectilinear flanks. As shown in Fig. 2 the comb like chasing tools 2 are so arranged circumferentially of the tool carrier drum 1 as to be spaced apart at equal angular ranges α. Further the teeth of all the comb like chasing tools have equal lengths b so that their rear faces R are also equally spaced. The front faces B as well as the rear faces R of the teeth extend parallel to the axis A—A of the drum (Fig. 3) and the distance C of one of the teeth from the guide surface 8 of the drum is constant for all the comb like chasing tools, that is, the respective tooth of each comb like chasing tool lies in a plane M—M which extends at right angles to the drum axis.

Further, all the tooth addendums are situated on the same diameter d. These teeth are undercut in the well known manner of comb like chasing tools, so that all sections taken in planes that extend parallel with the front faces B exhibit identical tooth profiles. In Fig. 1 it is indicated by a dotted line how the tool carrier drum is mounted in the tool carrier support by means of a shaft 4. Obviously the tool carrier drum 1 and the shaft 4 may form an integral piece.

The tool carrier drum, for example of a kind with a fine division being subjected to the influence of relatively small chasing thrusts only, can be maintained in position, by means of an indexing disc 11 and a holder 10 in a manner known per se (Fig. 4).

The comb like chasing tools may also be set in place on the drum in a manner similar to that of the cutting blades of cylindrical milling cutters (Fig. 4).

In all gear planing machines operating by means of comb like chasing tools the tool is held by a pivotal tool carrier plate which during the return stroke of the tool carrier ram is pivotally removed from the axis of the work for a certain distance, for the purpose of releasing the tool so as to clear the work. In like manner the tool carrier drum according to the present invention can be arranged on a displaceable tool carrier plate (Fig. 21).

However, the retracting of the teeth of the tool during the return stroke of the ram can be effected in more simple manner by rotating the tool carrier drum in a certain way. As the teeth of the tool are undercut so as to form an angle α between the front faces of adjacent teeth (Fig. 7) the contour of the teeth of the chasing tool is removed from the work axis if the drum is rotated in the direction as indicated by the arrow 9. In Fig. 7 the character g indicates the stretch for which the tooth contour is retracted from the working position by rotation of the tool carrier drum 1 through an angle β for releasing the teeth of the tool.

The pressure at which the tool is applied to the work is counteracted by the shaft journals 5, 6 (Fig. 1) and an arresting member 7 (Fig. 7) which bears against a rear face of the comb like steel chaser. After a certain number of gears have been machined, that is, on the completion of a single tooth on a gear or after the performance of a stroke by the tool carrier ram the tool carrier drum is rotated through an angular range α so that the next following comb like chasing tool is moved into working position. If rotating of the drum is required on the completion of each work tooth or the performance of each stroke of the tool carrier ram a separate feed contrivance must be provided for rotating the drum. By this feed contrivance also the arresting member is actuated while the drum rotates. By way of example, the arresting member 7 is pivotally displaced by a cam disc 44 (Figs. 10 and 11) which is mounted on the tool carrier drum shaft and is provided with as many cams as comb like chasing tools are arranged on the tool carrier drum, whereby the arresting member is moved into the dotted position shown in Fig. 7 and is then turned into arresting position again by a spring 45.

If, as desirable in cutting a tooth system into a gear of a relatively great diameter, the next following tool is to be rendered operative the tool carrier drum must be rotated through an angle α while the return stroke of the ram takes place. However, this rotation must not be continuous but must be carried out quickly after, at the end of the cutting stroke, the tool has been moved clear of the work, for example by an angle β. The rotation can then continue but so that the last stretch of the angular range α—β still to be passed through is again passed through quickly. Otherwise the liability exists that the teeth of the tool would foul with the gear tooth gaps while traveling through their path corresponding to the end portion of ram return stroke, due to the advance feed of the work for the thickness of the cutting which is intended to be detached during the next ram cutting stroke continuing as long as said return stroke endures.

The construction of the feed device for rotating the tool carrier drum assumes its simplest form if the rotation through the angular range α is carried out in two different phases, for example, at the end of the tool cutting stroke through the angular range β and at the end of the ram return movement through the angular range α—β.

In Figs. 8 and 9 an exemplification of such a feed device is shown. On the tool carrier drum shaft 4 a gear 12 is mounted which is intermittently rotated by means of the teeth of, what may be termed, a skip motion gear 13. This gear is provided with two groups of gear teeth that are offset relative to each other by 180°, the gear 13 being mounted on a shaft 14.

The gear 12 (Fig. 8) and the tool carrier drum 1 (Fig. 9) are rotated after each ram stroke by means of the skip motion gear 13 through a certain angular range the extent of which depends upon the number of gear teeth on the skip motion gear 13 and upon the proportion of the diameters of the gears 12 and 13. The angle α through which the tool carrier drum must be rotated after each ram reciprocation depends upon the number of comb like chasing tools as arranged on the tool carrier drum.

On the tool carrier drum shaft 4 is further arranged an indexing disc 15 which is equipped with as many grooves as rests are provided for the stoppage of the tool carrier drum in the course of one drum revolution. If, for example, the tool carrier drum carries six tools and the angular range of tool division α is to be subdivided into two phases of rotational movement, twelve rests and an indexing disc with twelve kerfs are necessary. This indexing disc serves for limiting the drum rotation which is effected by means of a dividing pin 17 which is provided on a dividing lever 16 (Fig. 8).

A spring 18 urges the dividing pin into the groove in the indexing disc. Before this disc and at the same time the tool carrier drum can be rotated the dividing pin must each time be retracted from engagement with the groove. The control of the dividing lever is effected by means of a cam disc 19 which is mounted on the actuating shaft 14 (Figs. 8 and 9).

In Figs. 10 and 11 a feed device is shown which is similar to that shown in Figs. 8 and 9, the configuration of the dividing lever 16' being somewhat modified from that of the dividing lever 16 and instead of a compression spring 18 a tension spring 18' is provided. The shaft 14 of the skip motion gear 13 is operatively connected with an actuating shaft 30 via bevel wheel drives 20, 21, 22, 23, a slide carrier shaft 24, spur gears 25, 26, a shaft 27, and a bevel wheel drive 28, 29, the shaft 30 making one revolution while the tool carrier ram performs a reciprocatory movement. The shaft 30 is mounted for rotation in the machine frame 31.

The tool carrier drum 1 is mounted for rotation together with the feed device on a tool support 38 which is secured to the tool carrier ram 37 (Fig. 10) and pivotally displaceable about the axis of rotation of the bevel wheels 21, 22. The tool carrier ram 37 can be actuated, for example, by means of a crank drive 33, 34, 35, 36 and is capable of sliding in guides on a rotatable part 32 which is rotatably arranged in the machine frame 31 and adapted to be fixed in position of adjustment on said frame and the axis of rotation of which coincides with the axis of the actuating shaft 30.

Figure 12:
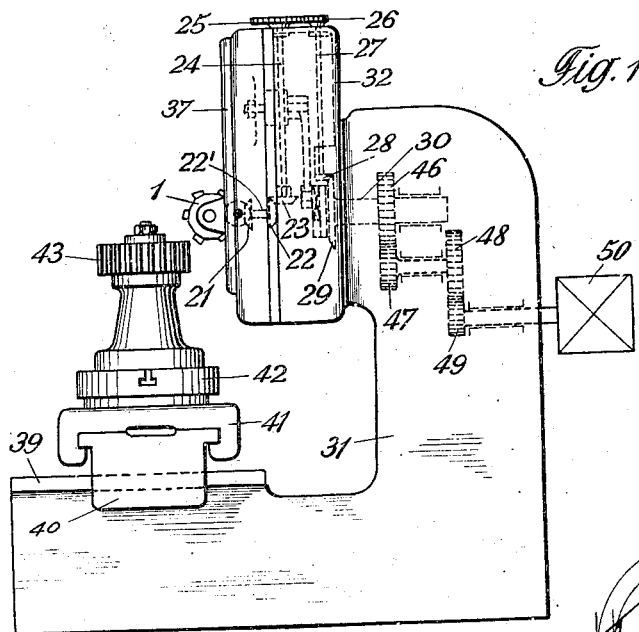
Fig. 12 shows an elevation of a gear planing machine equipped with a tool carrier drum according to the present invention.
Figure 13:
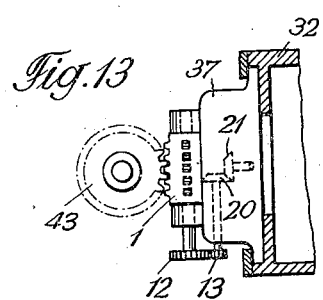
Fig. 13 shows the tool carrier ram of said machine in a top plan view partly in section.

On the bed 39 of the machine (Fig. 12) a feed slide 40 is arranged which carries in longitudinally movable relation thereto an involute motion controlled slide 41 on which a round table 42 supporting a work piece 43 is mounted. The involute motion controlled slide 41 and the round table 42 are connected with each other in a manner known per se through members that are not shown in the drawings, such as a worm drive, a screw spindle and back gears, so that the work can perform involute generating motion. The actuating shaft 30 is driven via gears 46, 47, 48, 49 by a motor 50.

Instead of employing a skip motion gearing other suitable kinds of skip motion drives, such as for example a Maltesian or a cam controlled drive may be used for rotating the tool carrier drum.

In such a gear planing machine which rotates the work after each ram stroke the teeth of the tool must be retracted from engagement with the work to an extent corresponding to the height of tooth profile at least, in order to prevent them from contacting with the work as the tool carrier drum rotates. This may be accomplished by arranging the tool carrier drum on a pivotal plate which moves through a plane extending parallel with the direction of the teeth of the work and the range of pivotal movement of which corresponds to said extent. However, with a view to simplifying the construction it is better to effect said retraction by means of an accordingly modified tool carrier drum, that is, reducing the number of comb like chasing teeth.

In Figs. 14, 15 and 16 various relative positions between the tool and the work are shown, Fig. 14 showing the relative position while the cutting stroke is in progress, Fig. 15 the relative position after the cutting stroke, and Fig. 16 the relative position at the end of the ram return movement for a tool carrier drum which is provided with four comb like chasing tools 51, 52, 53 and 54. With this construction the angle α of pivotal movement amounts to 90° for each reciprocation of the ram 37, that is, per revolution of the actuating shaft 30, this pivotal movement requiring again to be effected in two phases of part-rotation, one at the end of the cutting stroke and the other at the end of the tool return stroke. As each of these part-rotational movements must take place in a time corresponding to a relatively short path of travel of the ram these movements must be quickly effected. To this end, with advantage, a cam controlled drive is employed for effecting said rotations.

In Fig. 17 a tool carrier drum is shown which is provided with three comb like chasing tools 55.

From Figs. 14 to 16 it will be seen that the length b of the cutting teeth (Fig. 2) is limited if it is desired to release the tool so as to clear the work by rotational movement. The tool shown in Fig. 17 is not limited in this way.

When in a gear planing machine which operates in such manner that a tooth of the gear is completed while the tool performs a certain number of working strokes, whereupon the gear is rotatively advanced by one division, the driving movement of the tool carrier drum 1, instead of being derived from the actuating shaft 30, is derived from a member which intermittently moves only during the time of performance of the indexing operation, the tool carrier drum is capable of indexing on the completion of each individual tooth of the work instead of after each stroke.

Obviously the comb like chasing tools can be constructed, for example also as shown in Fig. 18, by equipping the tool with chip breaker teeth 56 or a certain number of the comb like chasing tools on a tool carrier drum may be in the form of roughing tools having thinner teeth than those on the other tools serving as planing tools. For such a construction it is indispensable that the middle planes of all the comb like teeth are moved in planes during the rotation of the drum that are perpendicular to the drum axis and the spacing of which is equal to the division of the comb like chasing tools. Such a combination of roughing and planing tools can, however, be employed only if the tool carrier drum can be rotated by hand.

A further species, such as shown in Fig. 19, results from applying the comb like chasing tool 57 as shown in Fig. 20 to a tool carrier drum 58 on the same principle as before. The use of the comb like chasing tool 51 brings with it the advantage that into the work 59 a gear system can be cut at a smaller stroke $h$ (length of travel of the cutting edge from S to S1) and in a correspondingly shorter working time than in using a normal comb like chasing tool 60 which requires a working stroke $h'$.

In Fig. 20 the comb like chasing tool 60 is shown by respective dotted lines to be in either end position of stroke. The tool carrier drum 58 shown in Fig. 20 can be set on a pivotal tool holder plate 61 which is mounted in a known manner on the tool carrier ram 63 for pivoting about an axle 62 extending parallel with the drum axis and is removed from the work axis as the tool carrier ram 63 performs its return stroke (Fig. 21).

I claim:

1. In a gear planing machine, means for fastening arcuate works in working position in the machine, a tool carrier ram reciprocable relative to said work fastening means at said working position, a tool carrier drum associated with said ram, said drum being arranged with its axis perpendicular to that of the ram, means for rotatably mounting and fixing said drum in position of rotational adjustment on said ram, a plurality of comb like chasers for cutting a system of involute shaped gear teeth into said work, cutting teeth for generating said gear teeth provided in said chaser combs, said teeth being disposed transverse to the direction of ram motion, and means for arranging said combs in parallelism with each other on said drum with the centre lines of said cutting teeth arranged in planes perpendicular to the axis of rotation of said drum as said drum rotates.

2. In a gear planing machine, means for fastening arcuate works in working position in the machine, a tool carrier ram reciprocating relative to said work fastening means at said working position, a tool carrier drum associated with said ram, said drum being arranged with its axis perpendicular to that of the ram, means for rotatably mounting and fixing said drum in position of rotational adjustment on said ram, a plurality of identical comb like chasers for cutting a system of involute shaped gear teeth into said work, cutting teeth for generating said gear teeth provided in said chaser combs, said teeth being disposed transverse to the direction of ram motion, and means for arranging said combs in parallelism with each other and equal angular ranges apart on said drum with the centre lines of said cutting teeth disposed in planes perpendicular to the axis of rotation of said drum as said drum rotates.

3. In a gear planing machine, means for fastening arcuate works in working position in the machine, a tool carrier ram reciprocating relative to said work fastening means at said working position, a tool carrier drum associated with said ram, said drum being arranged with its axis perpendicular to that of the ram, means for rotatably mounting and fixing said drum in position of rotational adjustment on said ram, a plurality of comb like chasers for cutting a system of involute shaped gear teeth into said work, cutting teeth for generating said gear teeth provided in said chaser combs, said teeth being disposed transverse to the direction of ram motion, means for arranging said combs in parallelism with each other on said drum with the centre lines of said cutting teeth positioned in planes perpendicular to the axis of rotation of said drum, and means for periodically rotating said drum into position of cutting engagement of the respective said comb with said work, for successively rendering said combs effective.

4. In a gear planing machine, means for fastening arcuate works in working position in the machine, a tool carrier ram reciprocating relative to said work fastening means at said working position, a tool carrier drum associated with said ram, said drum being arranged with its axis perpendicular to that of the ram, means for rotatably mounting and fixing said drum in position of rotational adjustment on said ram, a plurality of identical comb like chasers for cutting a system of involute shaped gear teeth into said work, cutting teeth for generating said gear teeth provided in said chaser combs, said teeth being disposed transverse to the direction of ram motion, means for arranging said combs in parallelism with each other and equal angular ranges apart on said drum with the centre lines of said cutting teeth located in planes perpendicular to the axis of rotation of said drum, means for periodically rotating said drum into position of cutting engagement of the respective said comb with said work, for successively rendering said combs effective, and means for additionally rotating said drum in the course of each reciprocation of said ram.

5. In a gear planing machine, means for fastening arcuate works in working position in the machine, a tool carrier ram reciprocating relative to said work fastening means at said working position, by effecting a cutting stroke and a return stroke during each reciprocation, a tool carrier drum associated with said ram, said drum being arranged with its axis perpendicular to that of the ram, means for rotatably mounting and fixing said drum in position of rotational adjustment on said ram, a plurality of identical comb like chasers for cutting a system of involute shaped gear teeth into said work, cutting teeth for generating said gear teeth provided in said chaser combs, said teeth being disposed transverse to the direction of ram motion, means for arranging said combs in parallelism with each other and equal angular ranges apart on said drum with the centre lines of said cutting teeth located in planes perpendicular to the axis of rotation of said drum, means for periodically rotating said drum through each said angular range into position of cutting engagement of the respective said comb with said work, for successively rendering said combs effective, and means for effecting said drum rotation through said angular range in two part-rotational movements, one of said part-rotations occurring at the beginning and the other part-rotation at the end of said cutting stroke of said ram.

6. In a gear planing machine, means for fastening arcuate works in working position in the machine, a tool carrier ram reciprocating relative to said work fastening means at said working position, a tool mounting support arranged on said tool carrier ram for pivoting about an axis on said ram, a rotationally adjustable tool carrier drum mounted on said support and drivable by means of an actuating shaft registering with said pivot axis for said support on said ram, said drum being arranged with its axis perpendicular to that of the ram, means for fixing said drum in position of rotational adjustment to said ram, a plurality of comb like chasers for cutting a system of involute shaped gear teeth into said work, cutting teeth for generating said gear teeth provided in said chaser combs, said teeth being disposed transverse to the direction of ram motion, and means for arranging said combs in parallelism with each other on said drum with the centre lines of said cutting teeth located in planes perpendicular to the axis of rotation of said drum as said drum rotates.

7. In a gear planing machine, means for fastening arcuate works in working position in the machine, a tool carrier ram reciprocating relative to said work fastening means at said working position, by means of an actuating shaft, a tool mounting support arranged on said tool carrier ram for pivoting about an axis on said ram, a rotationally adjustable tool carrier drum mounted on said support and drivable by means of an actuating shaft registering with said pivot axis for said support on said ram, said drum being arranged with its axis perpendicular to that of the ram, means for fixing said drum in position of rotational adjustment to said ram, an operative connection including said drum actuating shaft provided between said drum and said ram actuating shaft, a plurality of comb like chasers for cutting a system of involute shaped gear teeth into said work, cutting teeth for generating said gear teeth provided in said chaser combs, said teeth being disposed transverse to the direction of ram motion, and means for arranging said combs in parallelism with each other on said drum with the centre lines of said cutting teeth disposed in planes perpendicular to the axis of rotation of said drum as said drum rotates.

8. In a gear planing machine, means for fastening arcuate works in working position in the machine, a tool carrier ram reciprocating relative to said work fastening means at said working position, a tool carrier drum associated with said ram, said drum being arranged with its axis perpendicular to that of the ram, means for rotatably mounting and fixing said drum in position of rotational adjustment on said ram, a plurality of comb like chasers for cutting a system of involute shaped gear teeth into said work, cutting teeth for generating said gear teeth provided in said chaser combs, said teeth being disposed transverse to the direction of ram motion, a rear face on each said cutting tooth, means for arranging said combs in parallelism with each other and equal angular ranges apart on said drum with the centre lines of said cutting teeth located in planes perpendicular to the axis of rotation of said drum, an arresting member for counteracting the reaction pressure from said cutting teeth by bearing against said rear faces, and means for periodically rotating said drum into position of cutting engagement of the respective said comb with said work, for successively rendering said combs effective.

9. In a gear planing machine, means for fastening arcuate works in working position in the machine, a tool carrier ram reciprocating relative to said work fastening means at said working position, a tool carrier drum associated with said ram, said drum being arranged with its axis perpendicular to that of the ram, means for rotatably mounting and fixing said drum in position of rotational adjustment on said ram, a plurality of comb like chasers for cutting a system of involute shaped gear teeth into said work, cutting teeth for generating said gear teeth provided in said chaser combs, said teeth being disposed transverse to the direction of ram motion, means for arranging said combs in parallelism with each other on said drum with the centre lines of said cutting teeth positioned in planes perpendicular to the axis of rotation of said drum as said drum rotates, and means for rotatively advancing said drum on the completion of one gear tooth on said work at least.

ALBERT AEPPLI.

REFERENCES CITED

The following references are of record in the file of this patent:

UNITED STATES PATENTS

| Number | Name | Date |
| --- | --- | --- |
| 1,290,270 | Maag | Jan. 7, 1919 |
| 2,198,882 | Monroe | Apr. 30, 1940 |
| 2,282,193 | Lambrix | May 5, 1942 |

FOREIGN PATENTS

| Number | Country | Date |
| --- | --- | --- |
| 166 | Great Britain | Jan. 17, 1868 |
| 587,998 | Germany | Nov. 14, 1933 |